United States Patent [19]

Krebs

[11] 4,055,257
[45] Oct. 25, 1977

[54] STACKING APPARATUS

[75] Inventor: Charles Krebs, San Clemente, Calif.

[73] Assignee: Molins Machine Company, Inc., Camden, N.J.

[21] Appl. No.: 683,159

[22] Filed: May 4, 1976

[51] Int. Cl.² .............................................. B65G 57/02
[52] U.S. Cl. ................... 214/6 DK; 214/6 G; 214/6 S; 271/190; 271/201
[58] Field of Search ................... 214/6 DK, 6 G, 6 P, 214/6 S; 271/190, 200, 201

[56] References Cited

U.S. PATENT DOCUMENTS

| 2,875,908 | 3/1959 | Woodcock | 214/6 DK |
|---|---|---|---|
| 3,346,128 | 10/1967 | Hullhorst | 214/6 DK |
| 3,385,457 | 5/1968 | Zinn | 214/6 S |
| 3,471,038 | 10/1969 | Verrinder | 214/6 DK |
| 3,529,732 | 9/1970 | Wayne | 214/6 G |
| 3,598,252 | 8/1971 | Billett | 214/6 DK |
| 3,732,991 | 5/1973 | Von Gal et al. | 214/6 P |
| 3,941,048 | 3/1976 | Oe et al. | 214/6 S X |

Primary Examiner—L. J. Paperner
Attorney, Agent, or Firm—Seidel, Gonda & Goldhammer

[57] ABSTRACT

Apparatus is disclosed for stacking bundles such as bundles of paperboard sheets on a receiver. The apparatus includes an L-shaped conveyor having a top run and a bottom run. The top run of the conveyor has a position defined by the location of spaced first and second carriers having discrete guide members contacting the conveyor. The carriers are individually elevated with the second carrier being progressively elevated in stages while the first carrier moves up and down from a receiving position to a position corresponding to the current position of the second carrier.

11 Claims, 26 Drawing Figures

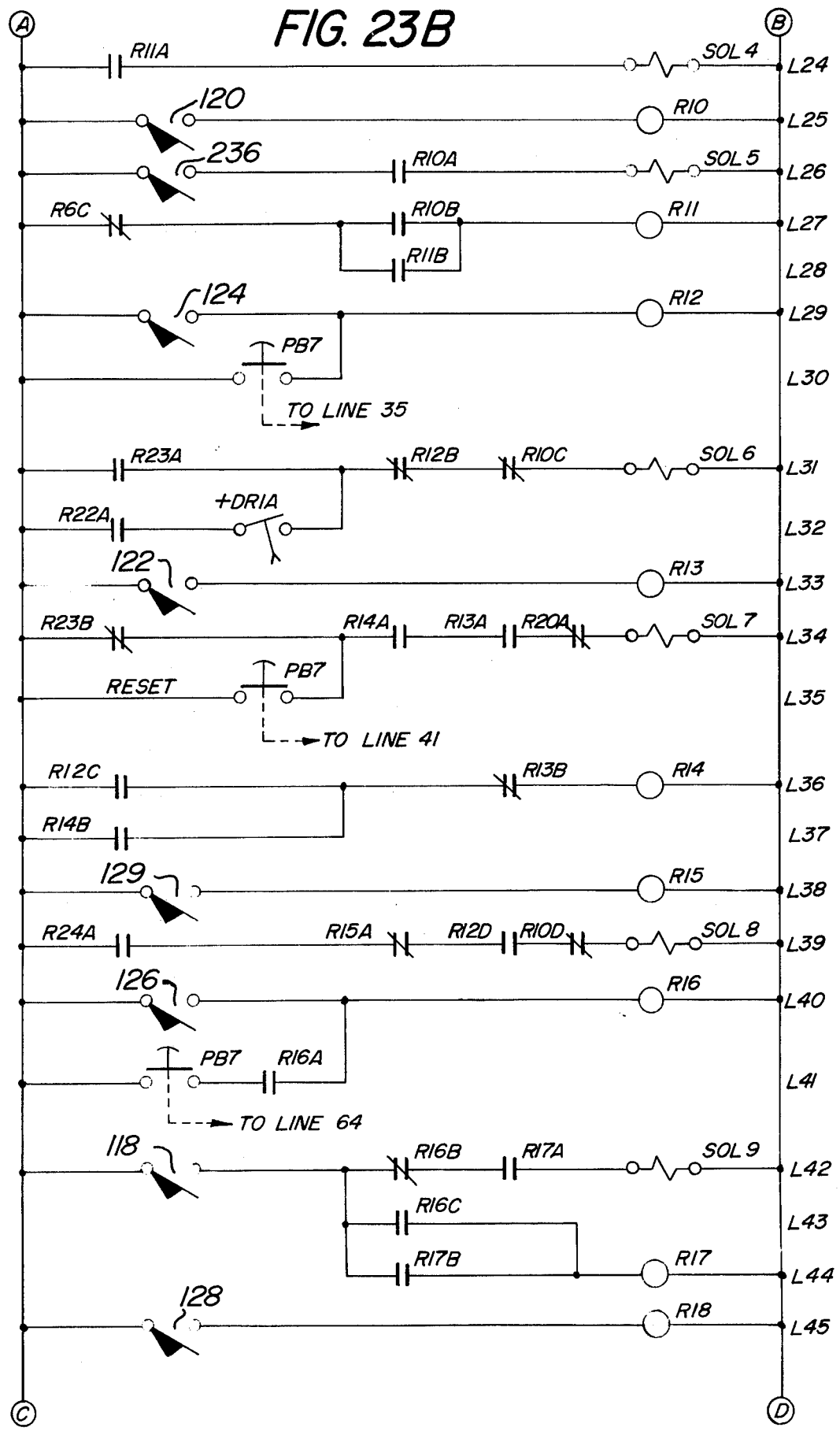

STACKING APPARATUS

BACKGROUND

Devices of the general type involved herein are shown in U.S. Pat. Nos. 3,013,369; 3,901,391; and 3,905,595.

This invention relates generally to apparatus for stacking loads of folded, flat boxes, particularly collapsed boxes of corrugated. Such boxes are delivered by the folder-gluer machine in stacks approximately one foot high, which may comprise 25 boxes. The stacks are delivered sequentially onto a conveyor from which they are generally manually removed and stacked. Keeping up with the speed of production of modern box-making machines placed a heavy burden on the workers who manually handled the stacks. Furthermore, hand-formed loads are often out of-square and may not ship well.

Prior art apparatus for stacking loads of collapsed boxes have not been well received by the industry because of their complexity. They were subject to frequent breakdowns and jamming. The driving mechanisms were noisy and, owing to their reciprocating action, generally hazardous. Many of the prior art apparatus had elevated receiving stations and therefore required inclined loading conveyors and operator platforms.

This invention is directed to an apparatus which uses the basic efficiency of an endless L-shaped conveyor having a top run and a bottom run connected to vertical runs. All runs of the conveyor are provided with guide members, some of which are fixed and some of which are supported in a manner so that their position may be changed. The location of the top run of the conveyor is determined by the position of its guide members which, in turn, are mounted on a pair of independently movable carriers.

The carrier is adjacent a separate portion of the top run of the conveyor and the carrier supports at least two movable guide members in contact with the top run of the conveyor. A motor is provided for moving the carrier in a vertical direction. A means is provided for cooperation with the carrier to facilitate transferring articles off the top run of the endless conveyor. A conveyor means is provided for receiving articles transferred off the top run.

The apparatus is adapted for automatic and/or manual operation. When on automatic operation, various limit switches and/or other sensors are utilized to initiate a sequential action.

The apparatus is also provided with means over the top run of the conveyor for centering individual stacks or layers of adjacent stacks so that each stack or layer of stacks is deposited squarely over a preceding one.

It is an object of the present invention to provide a novel apparatus capable of manual and/or automatic operation.

It is also an object of the present invention to provide a apparatus which centers stacks irrespective of the fashion in which they enter the machine.

It is another object of the present invention to provide a novel apparatus which can accept articles at the high delivery speeds of modern production equipment.

It is a further object of the present invention to provide an apparatus which requires no adjustments for different sizes of loads.

An additional object of the present invention is to provide an apparatus which can be served at floor level.

It is another object of the present invention to provide a novel apparatus structurally interrelated in a manner to provide various advantages and features as will be made clear hereinafter.

For the purpose of illustrating the invention, there is shown in the drawings a form which is presently preferred; it being understood, however, that this invention is not limited to the precise arrangements and instrumentalities shown.

Figure 23A:
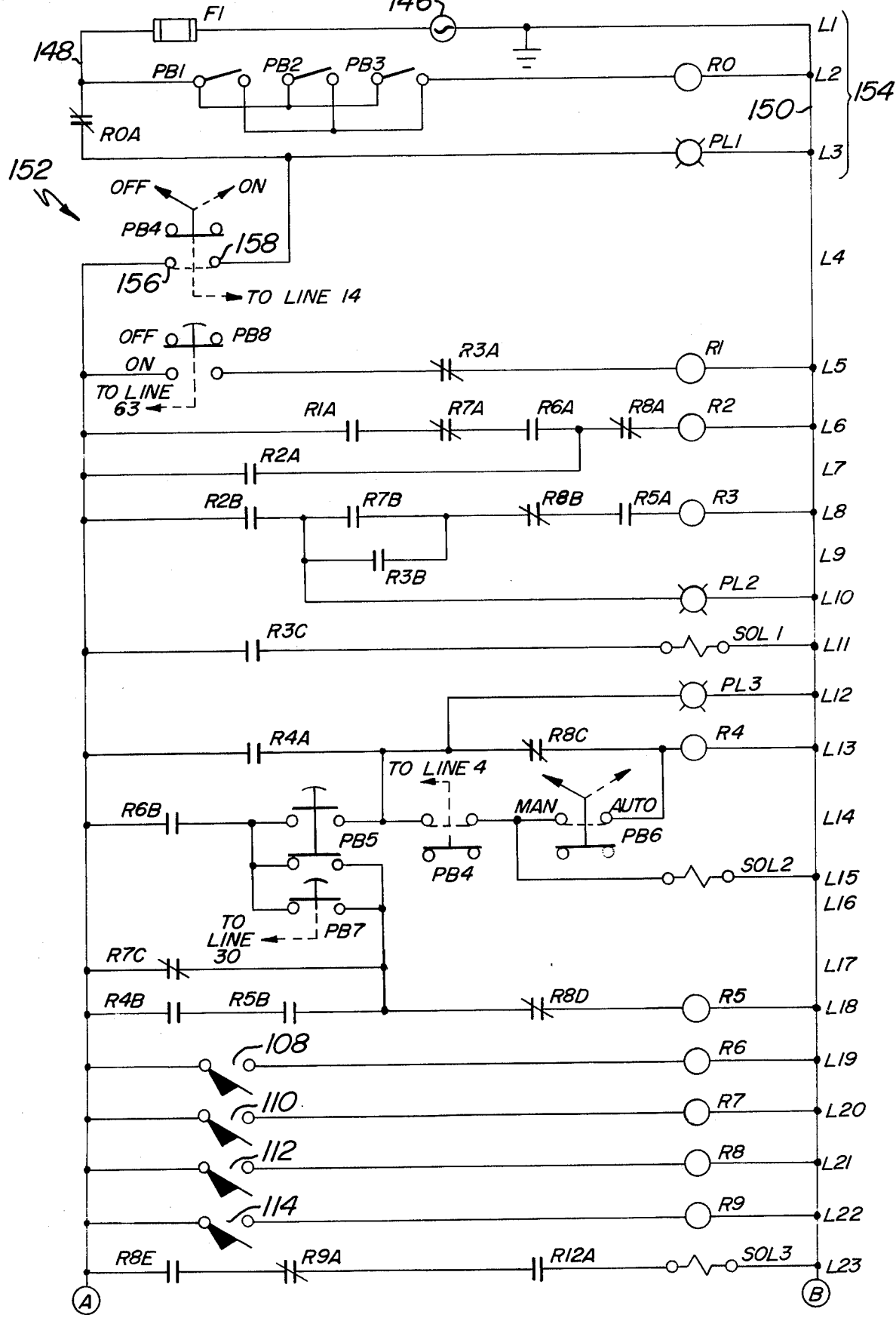

FIGS. 23A, B, and C are wiring diagrams.

Figure 24:
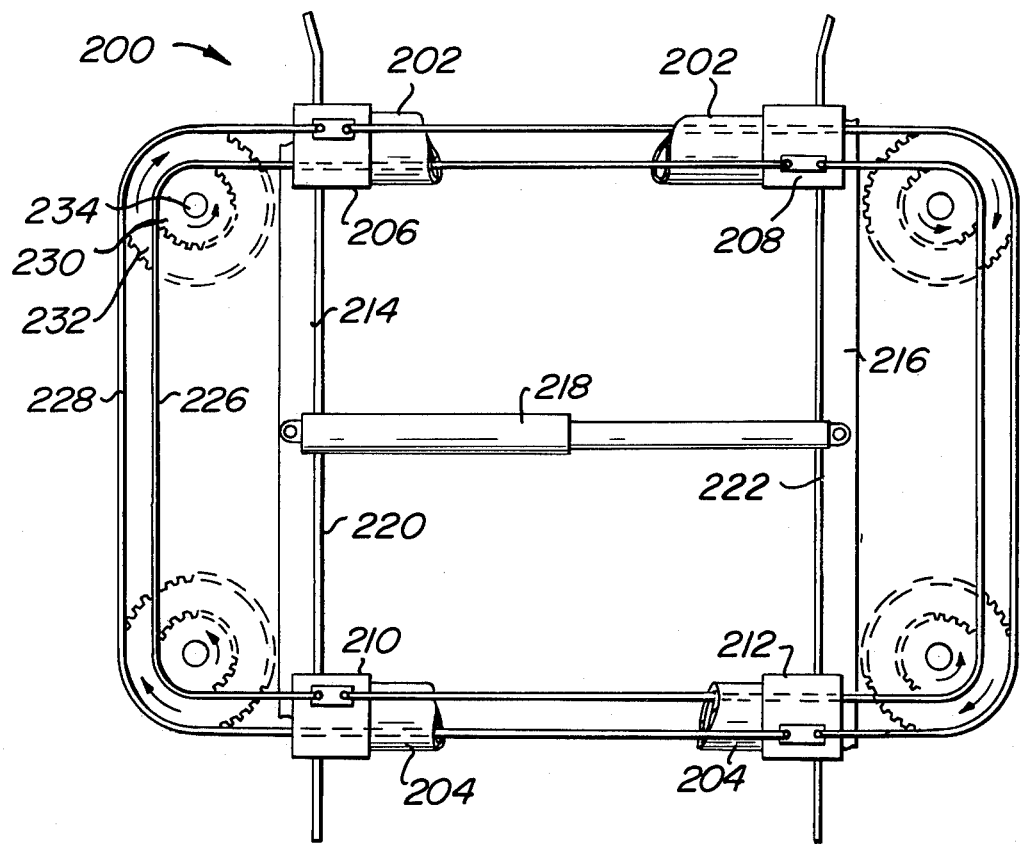

FIG. 24 is a plan elevation of the load centering mechanism.

Figure 4:
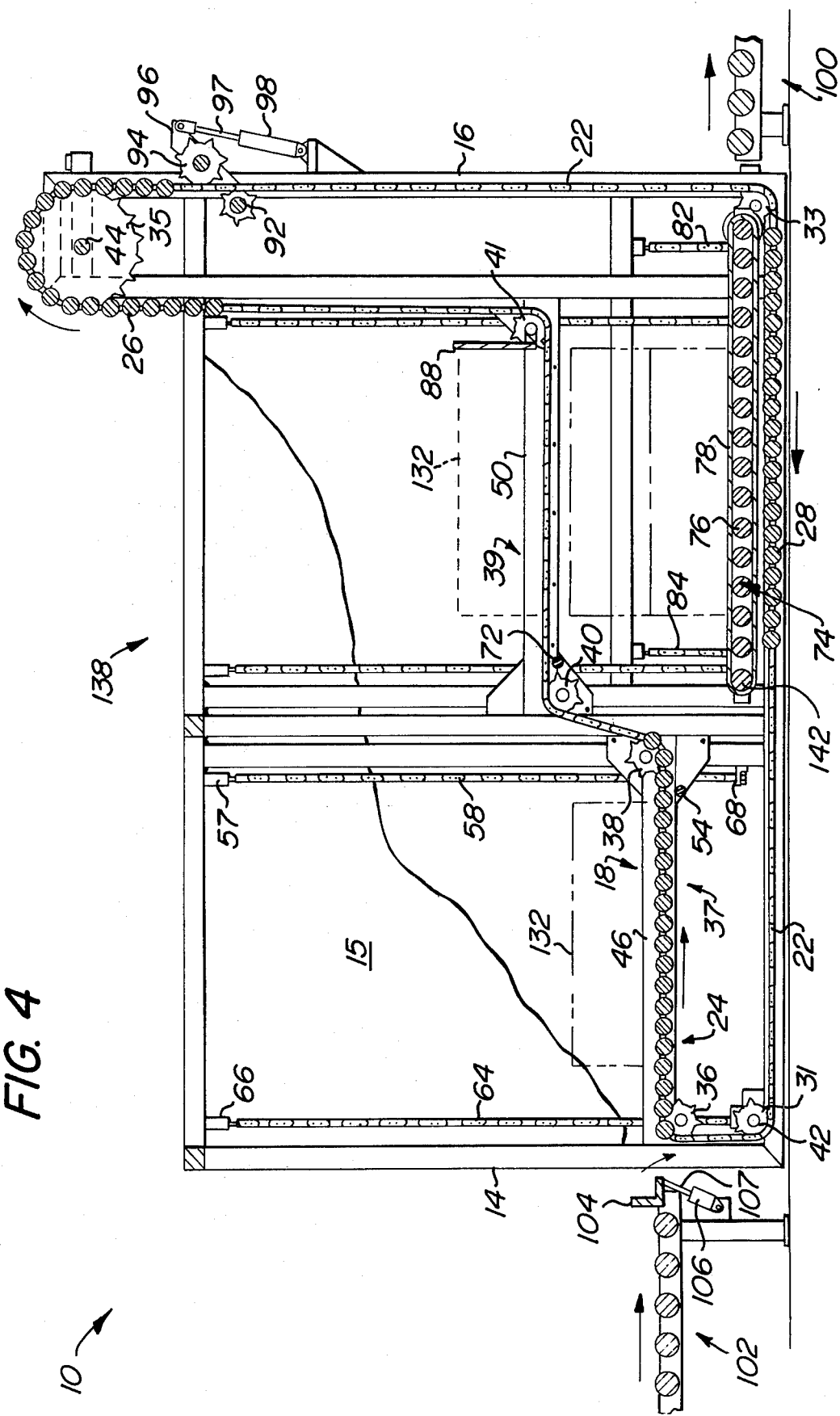
FIG. 4 is a sectional view taken along the line 4—4 in FIG. 1.
Figure 5:
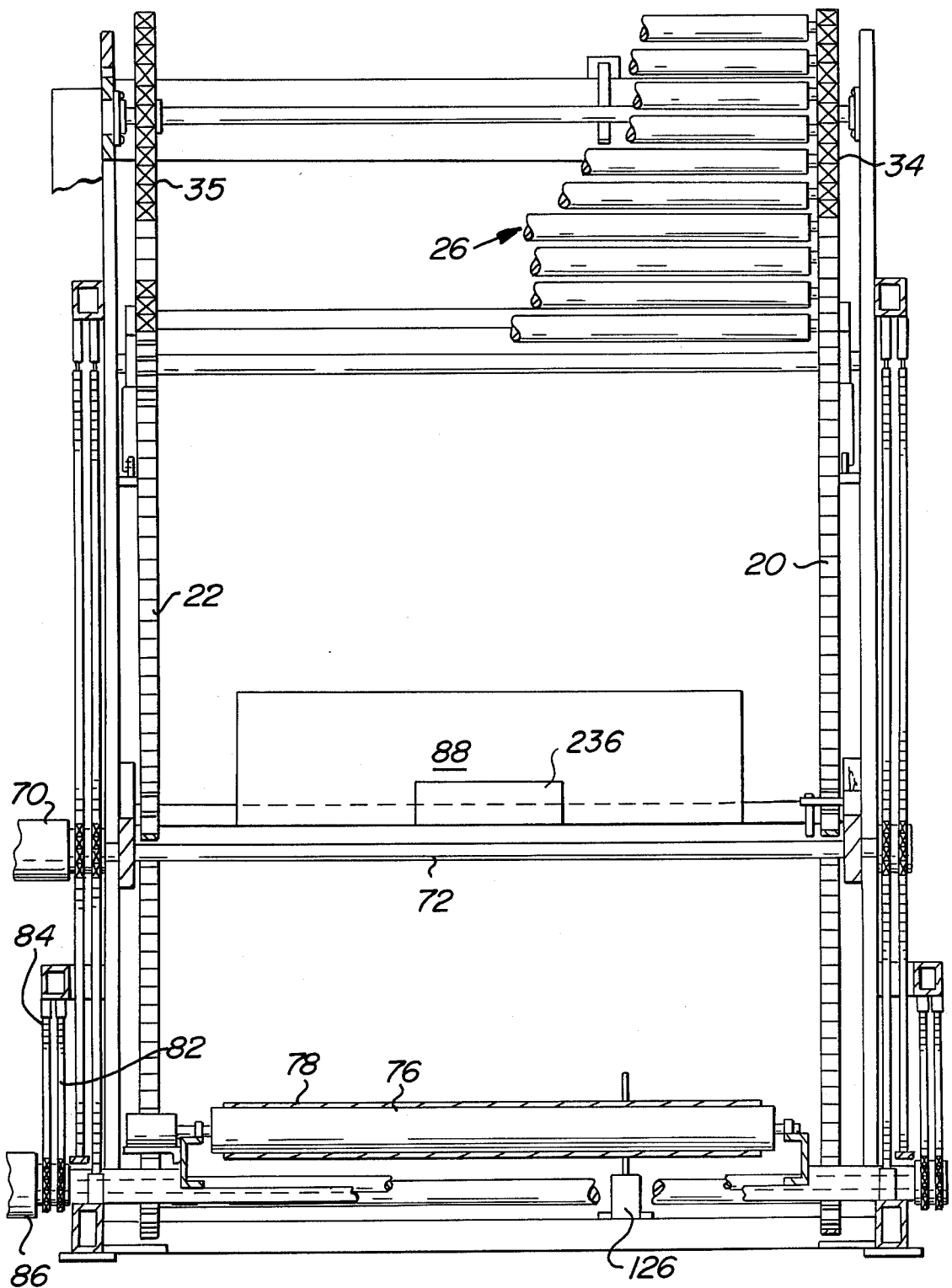
FIG. 5 is a sectional view taken along the line 5—5 in FIG. 2.

Referring to the drawing in detail, wherein like numerals indicate like elements, there is shown in FIG. 4 a bundle stack apparatus in accordance with the present invention designated generally as 10.

The apparatus 10 includes an article receiving conveyor 102 and a load forming device which has been designated generally as 138. The device 138 includes a frame which has been designated generally as 12. The frame has an inlet end 14 and an outlet end 16. Side walls 13 and 15 are provided on the frame to protect the machine attendants but have been eliminated from many of the figures for purposes of clarity of illustration.

The apparatus 10 includes an endless conveyor designated generally as 18. The conveyor 18 as will be described hereinafter is preferably generally L-shaped with a horizontal top run and a bottom run, which may be horizontal, connected to vertical runs. The conveyor 18 includes flexible endless chains 20 and 22 each along one side of the frame 12 and interconnected at spaced points therealong by at least one platform. As illustrated, there are three discrete platforms designated 24, 26 and 28. Each discrete platform is preferably made up of a plurality of discrete slats or similar members so that the platforms can pass around the various sprockets and guide members.

Figure 1:
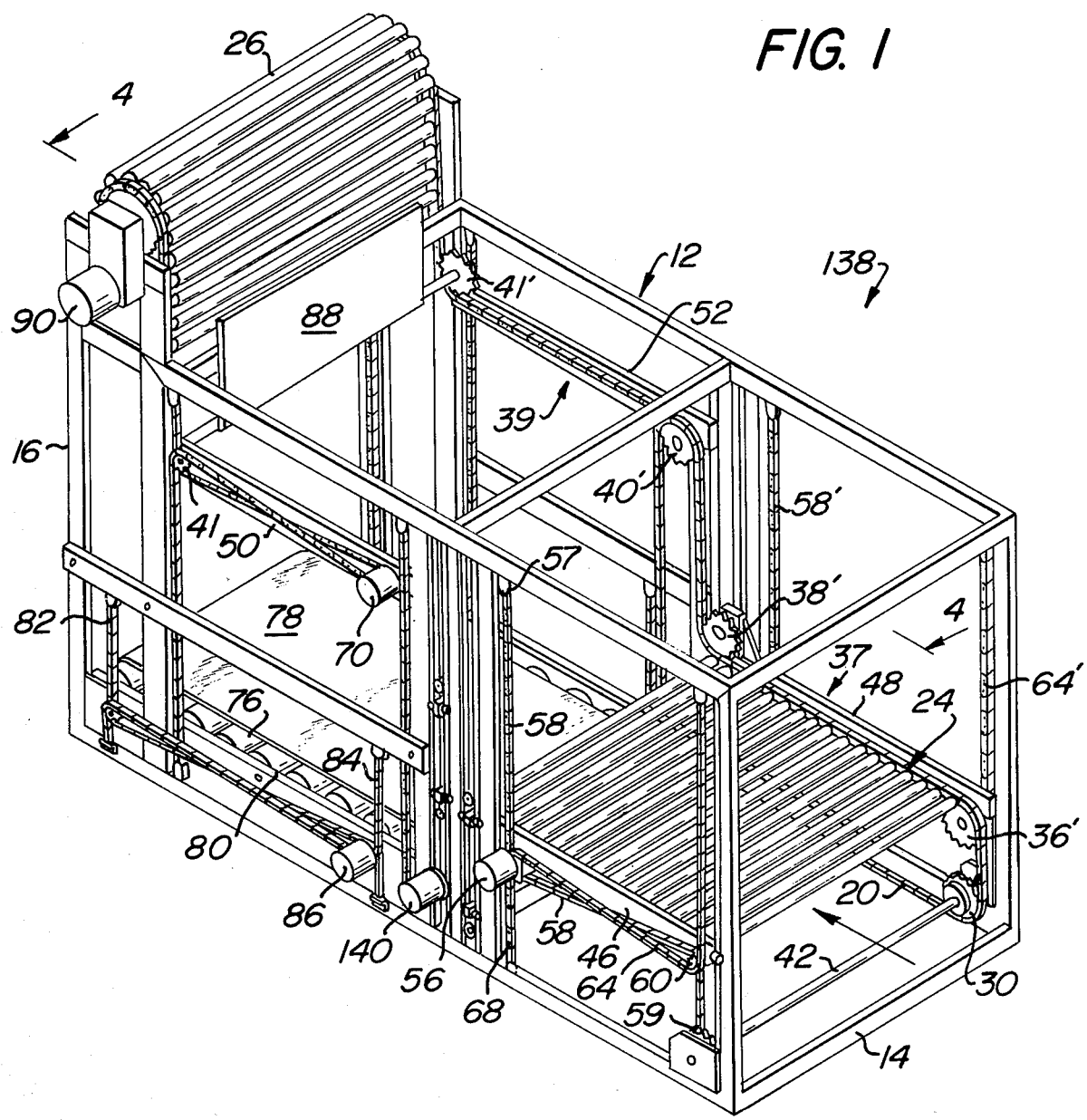
FIG. 1 is a perspective view of the apparatus of the present invention with some features not being illustrated for purpose of clarity.
Figure 2:
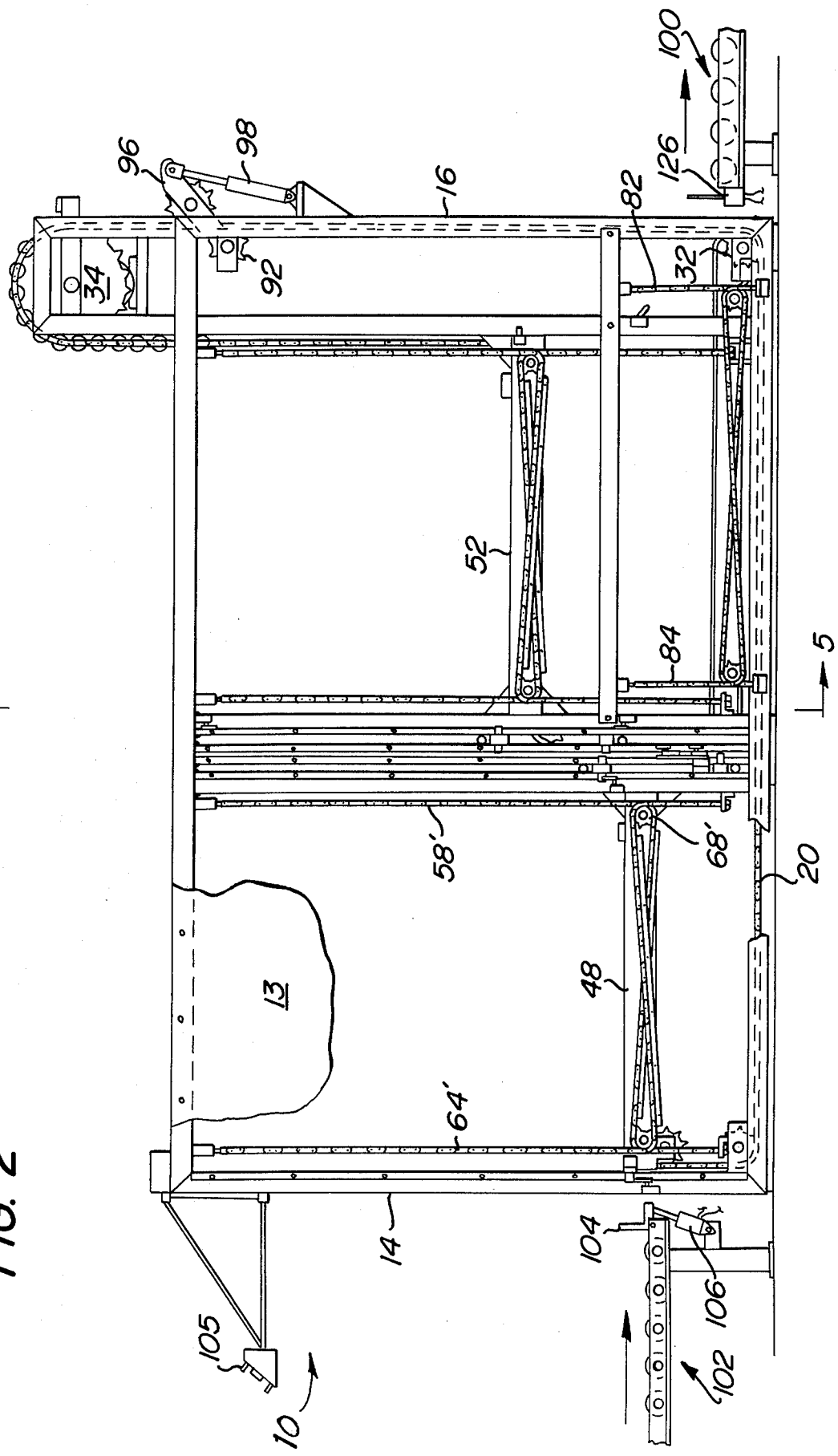
FIG. 2 is a side elevation view of the apparatus shown in FIG. 1.
Figure 3:
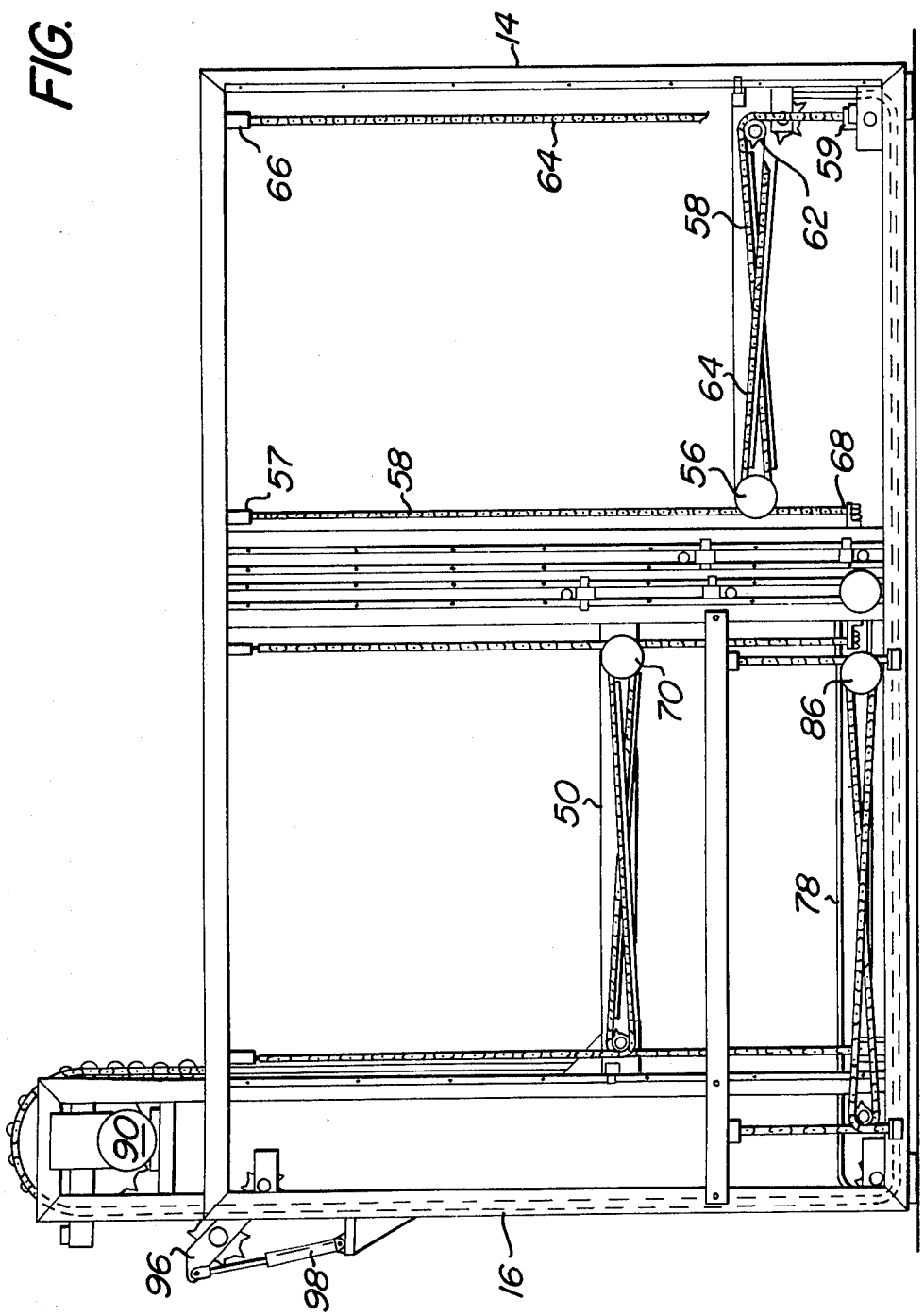
FIG. 3 is a side elevation view of the apparatus shown in FIG. 1 but on the opposite side from that illustrated in FIG. 2.

A pair of sprockets 30 and 31 is provided in the lower righthand corner of the apparatus 10 as shown in FIG. 1. Sprockets 30 and 31 remain at a fixed elevation on shaft 42. A similar set of sprockets 32, 33 is provided adjacent the bottom of the frame 12 at the outlet end 16 and is at a fixed elevation. Sprockets 34, 35 are supported in the upper righthand corner of frame 12 as shown in FIGS. 2 and 4. Sprockets 34 and 35 are at a fixed elevation.

A plurality of movable position sprockets or guide members is provided for the top run of the conveyor 18. The movable position guide members including sprockets 36 and 36' at one end of a first carrier 37 and sprockets 38, 38' at the other end of the carrier 37. The carrier 37 supports a first portion of the top run of the conveyor 18 and is supported by the frame 12 for movement in a vertical direction to change the elevation of said portion of the top run of the conveyor 18. The first carrier 37 is defined by side plates 46 and 48 interconnected by shaft 54.

A second carrier 39 having movable positioned guide members for another portion of the top run of the conveyor 18 is provided downstream from the first carrier 37. The second carrier 39 includes side plates 50 and 52 interconnected by a shaft 72. The second carrier 39 supports sprockets 40 and 40' at its inlet end and 41 and 41' at its outlet end. The second carrier 39 is supported by the frame 12 for independent movement in a vertical direction.

The sprockets 30 and 31 are synchronized by being connected to shaft 42. Sprockets 32 and 33 are likewise synchronized by being connected to a common shaft. Sprockets 34 and 35 are synchronized by being mounted on a common shaft 44.

A reversible motor 56 is supported by the first carrier 37 on plate 46 for movement therewith. The motor 56 at its output end has a pair of sprockets, each of which is measured with one of the chains 58, 64. The chains 58, 64 are of finite length.

Chain 58 has one end 57 connected to the frame 12. The chain 58 extends downwardly from end 57, around a sprocket of motor 56, upwardly so as to extend around sprocket 60 on side plate 46, and then downwardly to the end 59 on the frame 12. The chain 64 has one end 68 fixed to the frame 12, extends upwardly therefrom around another of the sprockets of motor 56, is angled downwardly so as to extend around the bottom of sprocket 60, and then upwardly to the fixed end 66 on the frame 12. Hence, as motor 56 rotates in one direction, the first carrier 37 defined by side plates 46 and 48 moves upwardly. When the motor 56 rotates in an opposite direction, the first carrier 37 moves downwardly. The side plates 46 and 48 are provided with rollers in rolling contact with vertically disposed tracks on the frame 12.

In order that both of the side plates 46 and 48 will move simultaneously, a complete and independent set of chains 58' and 64' is provided on the opposite side of the frame for meshing engagement with the pair of sprockets supported by the side plate 48. In this manner, the first carrier 37 will be horizontally disposed while moving in a vertical direction when motor 56 is actuated as will be explained hereinafter.

The second carrier 39 defined by side plates 50 and 52 is downstream from the first carrier 37 and is provided with an independent reversible motor 70 thereon. The motor 70 is coupled to a pair of chains on one side of the second carrier 39 in the same manner as described above. A matching set of chains is provided on the opposite side of the second carrier 39 in the same manner as described above. The second carrier 39 is likewise provided with rollers in contact with vertical tracks of the frame 12 so that it may move in a vertical direction independently of the first carrier 37.

An endless conveyor 74 is provided at a location below the location of the second carrier 39. See FIG. 4. The conveyor 74 includes an endless belt 78 extending around rollers 76 disposed between the runs of the belt 78. An independent motor 140 is coupled to the journal of end roller 142 of the rollers 76 for driving the belt 78.

The elevation of the conveyor 74 is selectively changed by reversible motor 86 on the elevator 80. The elevator 89 rotatably supports the ends of the rollers 76. The motor 86 is provided with a pair of output sprockets each meshed with one of the chains 82, 84 of finite length. The chains 82, 84 are connected at their ends to the frame 12 in the same manner as described above in connection with chains 58, 64. Hence, when motor 86 rotates in one direction, the conveyor 74 is elevated, and when the motor 86 rotates in an opposite direction, the conveyor 74 descends to its lowermost position as shown in FIG. 4.

The frame 12 is provided with a limit stop 88 preferably in the form of a vertically disposed plate fixed to the carrier side plates 50 and 52. It will be noted that the limit stop 88 is at the downstream end of the second carrier 39.

Referring to FIGS. 1 and 4, it will be noted that the chains 20, 22 extend upwardly from the sprockets 30, 31 so as to extend around the top of a set of sprockets at the inlet end of the first carrier 37 and around the bottom of the set of sprockets at the outlet end of the first carrier 37. That sequence is repeated whereby the chains extend upwardly around the top of the sprockets at the inlet end of the second carrier 39 and then around the bottom of the sprockets at the outlet end of the second carrier 39. From the second carrier 39, the chains extend upwardly around the larger diameter sprockets 34, 35 on the shaft 44. Shaft 44 is driven by motor 90 with a suitable speed reducer therebetween. As shown more clearly in FIG. 4, an idler sprocket 94 is provided for each of the chains 20, 22 at an elevation above the elevation of the idler sprocket 92.

The sprockets 94 are on a common shaft supported by a pair of pivotably mounted arms 96. The arms 96 are interconnected and pivoted by means of a power cylinder 98. Actuation of the cylinder 98, which is pivotably mounted on its lower ends in FIG. 4, causes the sprocket 96 to move to the left in FIG. 4 to take up slack on the chains 20, 22 as will be explained in greater detail hereinafter.

Figure 7:
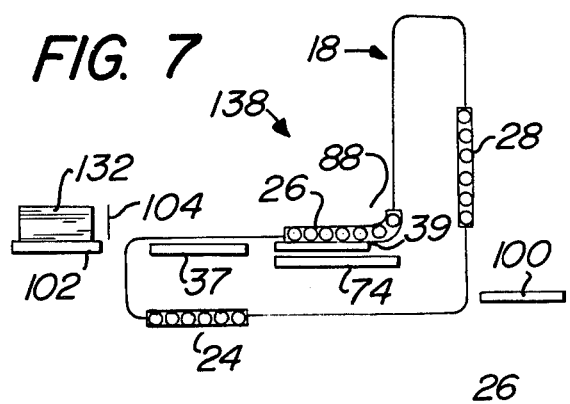
FIGS. 7-22 are diagrammatic progressive illustrations of the operation of the apparatus of the present invention.
Figure 8:
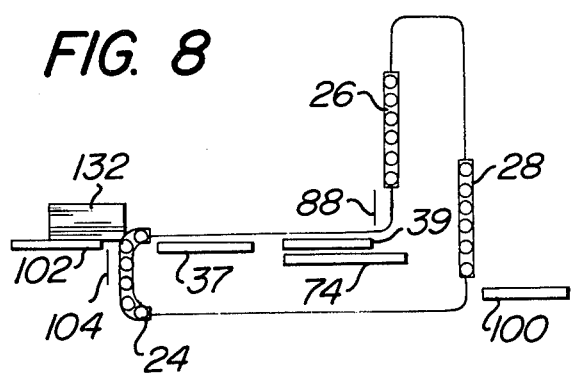
Figure 20:
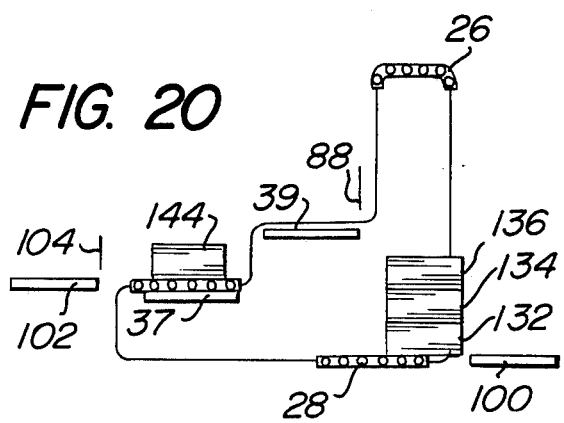
Figure 21:
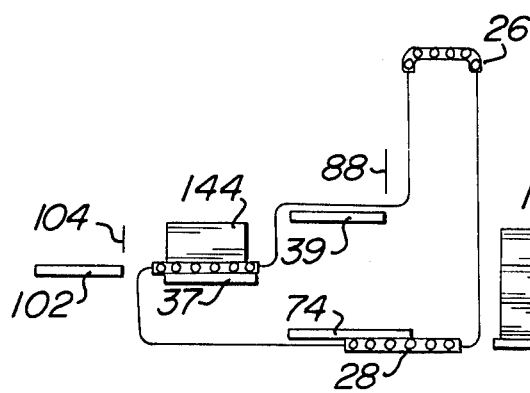

Referring now to FIGS. 7 and 20, it is to be noted that the lengths of chains 20 and 22 in FIG. 7 appear to be less than the lengths of the chains 20 and 22 in FIG. 20. Cylinder 98 through arm 96 and sprocket 94 exert thrust on the chains. When the second carrier 39 is elevated as shown in FIG. 20, the thrust exerted on the chains by the cylinder 98 is overcome and the conveyor chains 20 and 22 assume an approximately straight line between the upper sprockets 34 and 35 and the lower sprockets 32 and 33.

Then, when carrier 39 is in the lowest position shown in FIG. 7, cylinder 98 through arm 96 and sprockets 94 removes slack from the chains 20 and 22 by exerting thrust between sprocket 92 and sprocket 35. In this manner, the motion of the platforms 24, 26, 28 through the machine is uniform with no jerking as the slack in the chain is taken up.

Referring to FIG. 24, there is shown a bundle centering device which has been designated generally as 200. The purpose of the bundle centering device 200 is to orient bundles so the edges of individual sheets are parallel with the conveyor and properly centered.

The bundle centering device 200 is supported by four columns, two of which are fastened to each side of carrier 39. Two guides 202, 204 extend transversely across the carrier 39 for guiding freely-slidable blocks 206, 208, 210, 212. The sliding blocks 206, 210 work as a unit and are joined by support member 214. The sliding blocks 208, 212 also work as a unit and are joined by similar support member 216. The rod end of extensible power cylinder 218 is attached to support member 216 and the opposite end is fastened to support member 214.

Each pair of sliding blocks supports a wing panel 220 and 222. The wing panels 220, 222 are moved reciprocatively in synchronism by applying pressurized fluid such as air to alternate sides of the clinder 218.

To insure that the wing panels 220 and 222 retain their parallelism, they are synchronized by cables 226 and 228. The inner cable 226 is fastened to two diagonally opposed blocks 208 and 210. The other cable 228 is fastened to the other two diagonally opposed blocks 206 and 212. The cables are piloted by discrete, freely-rotatable sheaves 230 and 232, and mounted on common shafts 234.

The control circuitry for the cylinder 218 includes a pressure control valve, not shown, which may be manually set whereby sufficient force can be applied to the wing panels 220 and 222 to align a bundle without causing deformation as the panels move towards each other.

It is to be noted that limit stop 88 is provided with switch 236 which is activated by pressure from a bundle carried on the endless conveyor 18. Triggering of switch 236 activates a solenoid selector valve which directs pressurized fluid to the cylinder 218 to close the wing panels. When the bundle drops from the conveyor platform, the switch 236 opens and the wing panels retract.

A discharge conveyor 100 may be provided adjacent the outlet end 16. See FIG. 4. The discharge conveyor 100 is provided in this instance for illustrative purposes and only forms an optional part of the herein-disclosed invention. If preferred, the load may be received on a pallet or a fork lift truck.

Figure 6:
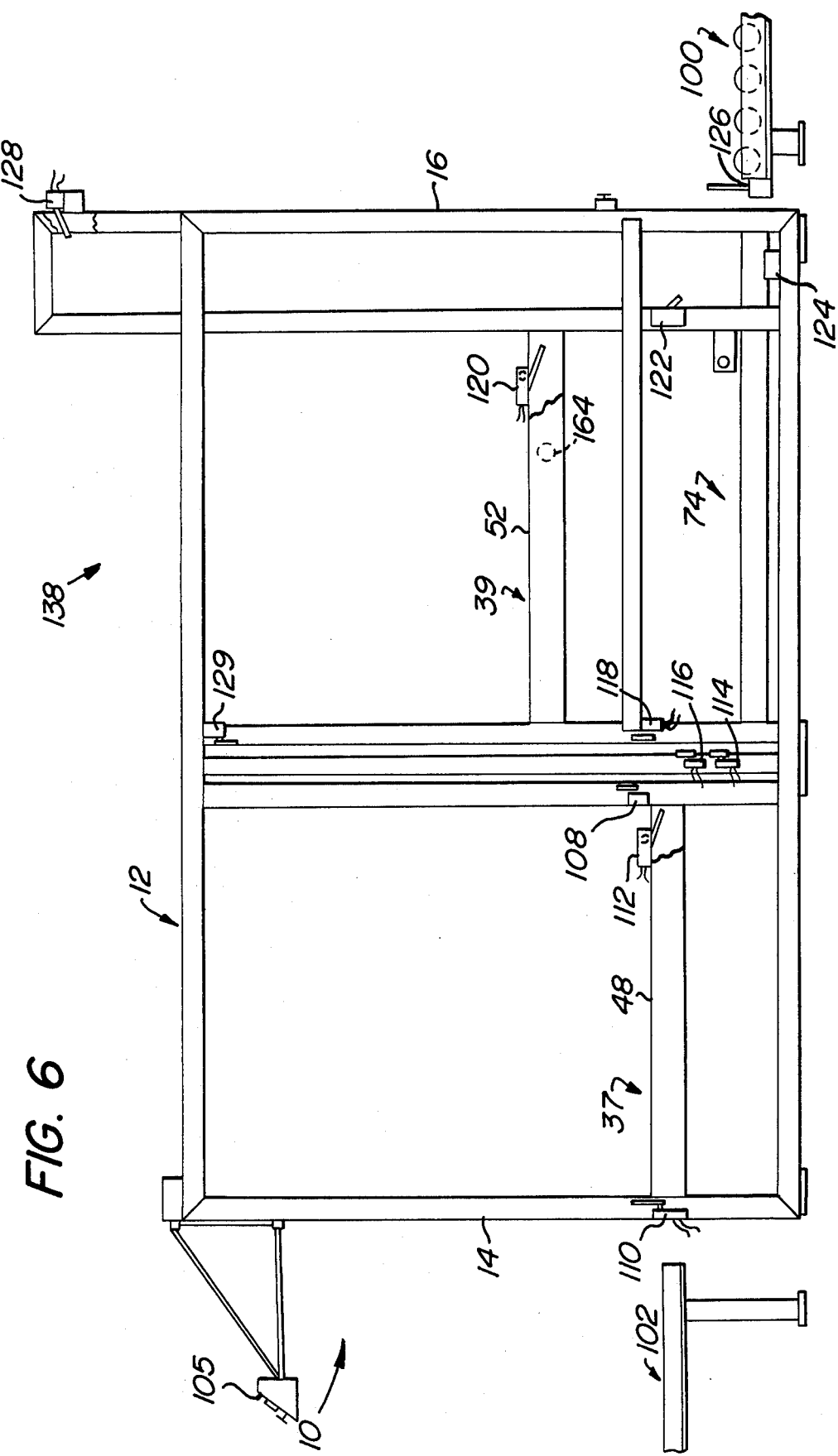
FIG. 6 is a diagrammatic illustration of the frame with various switches and sensors mounted thereon but with various other components in the conveyor being not shown.

Referring to FIG. 6, the frame 12 is diagrammatically shown with the carriers 37, 39 and various controls including switches 108-129 and 236. The second carrier 39 has mounted thereon a photocell 164.

The operation of apparatus 10 can best be described with reference to FIGS. 7-22. FIGS. 7-22 are schematic diagrams of the apparatus in various stages of the operation. FIG. 7 illustrates the position of the major components of the apparatus just prior to the initiation of a stacking operation. As will be shown in greater detail below, the apparatus can be preprogrammed to stack any desired number of bundles. For the purposes of illustration, it will be assumed that the apparatus has been preprogrammed to automatically stack a set of three bundles and then discharge the three bundles onto discharge conveyor 100. Prior to the bundle stacking operation, gate 104 is in its upper position and prevents feed conveyor 102 from discharging bundle 132 onto load forming device 138.

When the stacking operation is to begin, presses a bottom at the control unit 105 whereby power is applied to motor 90 and endless conveyor 18 is enabled. As the first platform 24 reaches the position illustrated in FIG. 8, gate 104 is lowered and fed conveyor 102 discharges bundle 132 onto platform 24. Compare FIGS. 8 and 9. When platform 24 reaches the position shown in FIG. 9, gate 104 is raised to prevent conveyor 102 from feeding further bundles onto the load forming device 138. Endless conveyor 18 continues to advance platform 24.

When bundle 132 reaches limit stop 88, switch 236 is triggered by the bundle causing centering device 200 to orient the bundle in the manner described above. Meanwhile, platform 24 continues to advance and bundle 132 is pushed off the trailing end of platform 24. Switch 236 is released and wing panels on centering device 200 return to their ready position permitting bundle 132 to rest on conveyor 74. See FIG. 11.

Once bundle 132 has been placed on conveyor 74, the light emitted by light source 164, located on carrier 39, is blocked and motor 86 lowers platform 74 until bundle 132 clears light source 164. See FIG. 12.

Figure 12:
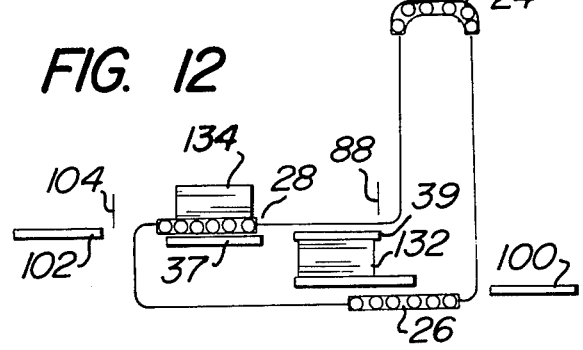
Figure 13:
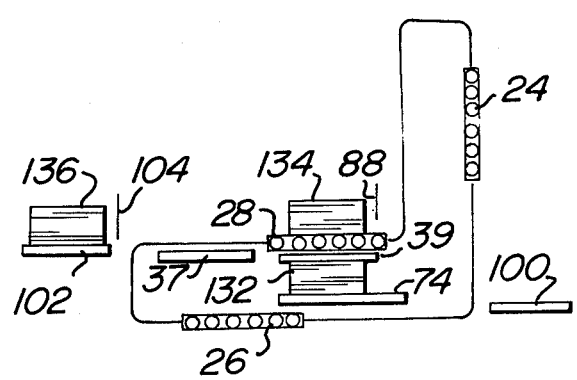
Figure 14:
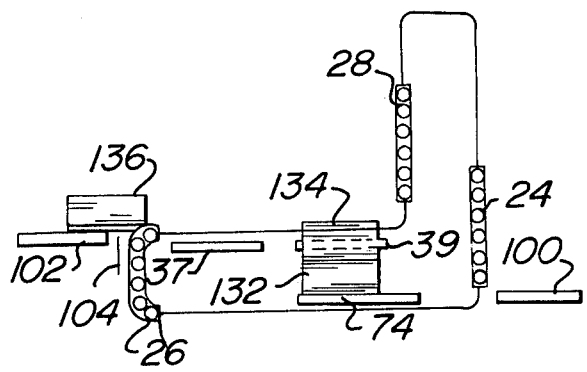

In the meantime, a second bundle 134 has been transferred onto platform 28 in the manner previously described for bundle 132. As shown in FIG. 12, the platform 28 advances the second bundle 134 until it likewise contacts limit stop 88. Bundle 134 trips switch 236, is centered by device 200, is transferred off the trailing end of platform 28 and is deposited on the top of bundle 132. See FIGS. 13 and 14.

Light from the light source 164 is now blocked by bundle 134 and motor 86 is energized to lower conveyor 74. When conveyor 74 reaches its lowermost position illustrated in FIG. 14, motor 86 is disabled. The light from light source 164 is still, however, blocked by bundle 134. Accordingly, motor 70 is enabled to raise carrier 39 above the top of bundle 134 so that the light from photocell 164 is no longer blocked thereby. See FIG. 15.

As above, a new bundle 136 has been transferred onto platform 26. Carrier 37 is raised to the lever of carrier 39 so that bundle 136 can be transferred to the remaining bundles 132, 134. Compare FIGS. 15, 16 and 17.

Platform 26 continues to move. Bundle 136 is centered as described above and is then transferred off the back edge of platform 26 on the top of bundle 134. Simultaneously, carrier 37 is caused to descent to its bundle receiving position to receive a new bundle 144. See FIG. 18.

The light from photocell 164 is again blocked by bundle 136 and motor 70 is enabled to raise carrier 39 to a level above the top of bundle 136. See FIG. 19. A total of three bundles have now been transferred to conveyor 74. Motor 90 is disabled stopping the rotation of endless conveyor 18. Simultaneously, motor 140 is enabled causing conveyor 74 to transfer bundles 132-136 to discharge conveyor 100. It should be noted at this time that motor 90 will not be disabled until platforms 26-28 are located in the positions illustrated in FIG. 19. When so located, the platforms 24-28 will not prevent the bundles from being transferred to conveyor 100.

After bundles 132-136 have been transferred to discharge conveyor 100, motor 70 will be enabled to lower conveyor 39 to its lowermost position and motor 86 will be enabled to raise platform 74 to its uppermost position. See FIG. 7. Motor 90 is again enabled and a new stack of bundles is formed in the manner described above.

Figure 23C:
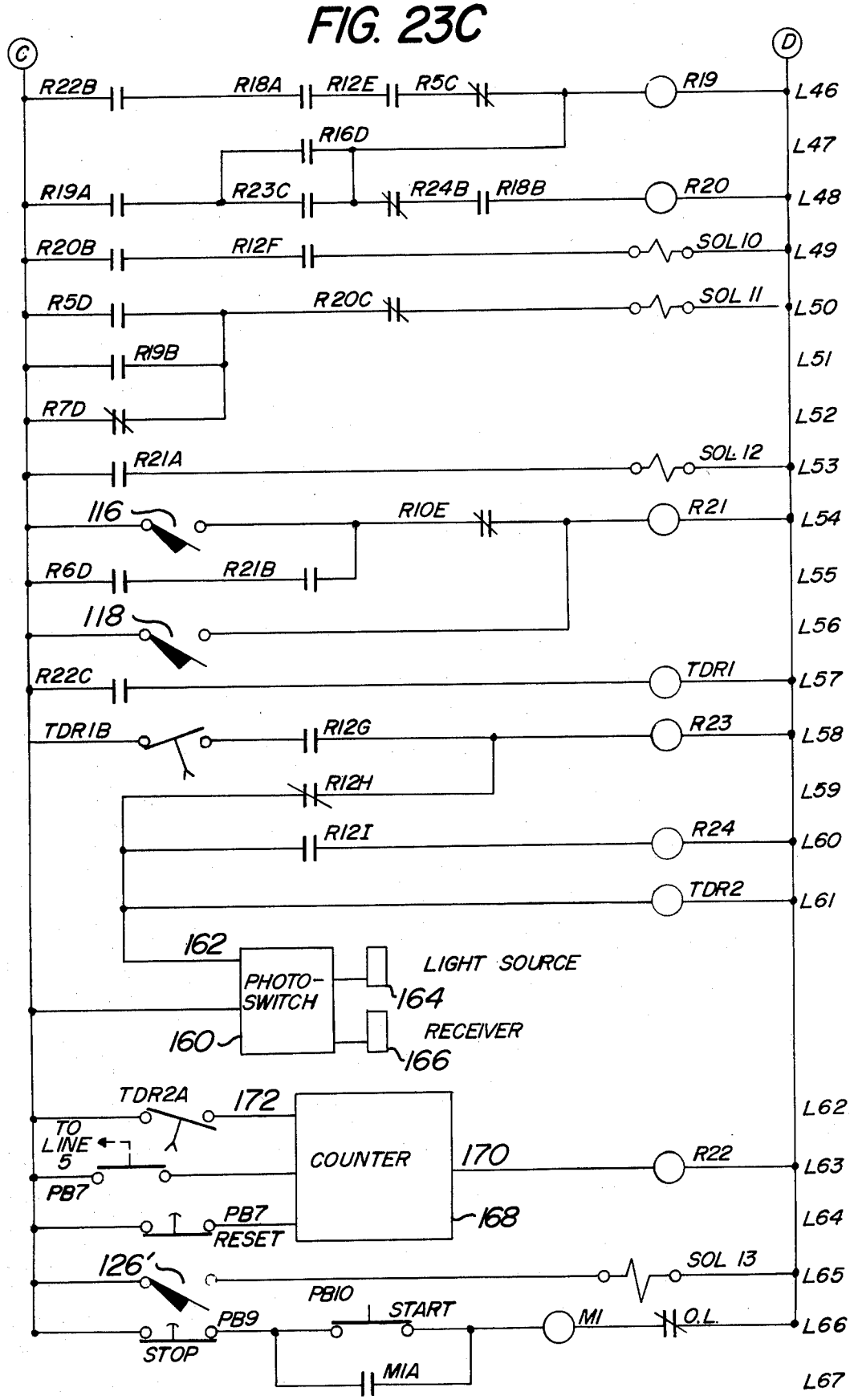

The control circuitry for performing the foregoing operation is illustrated in FIGS. 23A-23C and FIG. 6. FIGS. 23A-23C illustrate the electrical control circuitry while FIG. 6 illustrates the positioning of switches 110-129 and 236 with respect to load forming device 138.

Referring to FIG. 23A, a power source 146 is connected between buses 148 and 150 and provide power to control circuit 152. A fuse F1 provides protection from undesirable overloads. Emergency stop switches PB1, PB2 and PB3 are placed in series with relay R0 on line 2 and cut-off power to control circuitry 152 when depressed. Specifically, whenever one of switches PB-1, PB-2, PB-3 is depressed, relay R-0 is energized and normally closed switch RO-A is opened. Emergency stop switches PB-1, PB-2, PB-3 are placed at diverse locations on load forming device 138 for easy access during emergency situations.

Indicator light PL-1 is enabled whenever normally closed switch RO-A is closed and indicates that power is available for control circuit 152. Power on switch PB-4 connects power circuit 154 to control circuit 152. Power on switch PB-4 is a bistable pushbutton switch which alternates between two positions each time it is depressed. When initially depressed, pushbutton switch PB-4 connects terminals 156 and 158 thereby connecting power circuit 154 to control circuit 152. Switch PB-4 remains in this position until depressed a second time.

Feed conveyor start switch PB-8 is also a bistable pushbutton switch. When in the ON position, pushbutton switch PB-8 closes lines L-5 and L-63. Palletizer start pushbutton PB-5 is a monostable pushbutton switch which is normally biased in the open position. Pushbutton switch PB-5 will remain biased in the open position unless held closed by some external force. Reset pushbutton switch PB-7 is also a monostable switch which is biased in the open position. When pushbutton switch PB-7 is depressed, it completes a circuit in lines L-16, L-30, L-35, L-41 and L-64. Load switch PB-6 is also a bistable switch which changes positions each time depressed.

Relay R-1 is coupled to normally open switch R-1A in line L-6. When relay R-1 is energized, normally open switch R-12A is closed. Relay R-2 is coupled to normally open switches R-2A and R-2B in lines L-7 and L-8, respectively. When relay R-2 is energized, normally open switches R-2A and R-2B are closed. Relay R-3 is coupled to normally closed switch R-3A in line L-5 and normally open switches R-3B and R-3C in lines L-8 and L-11, respectively. When relay R-3 is energized, normally closed switch R-3A is opened and normally open switches R-2B and R-2C are closed.

Indicator light PL-2 is enabled when relay R-2 is energized and indicates that feed conveyor 102 is delivering a bundle to be stacked onto load forming device 138.

Solenoid SOL-1 in line L-11 controls the operation of cylinder 106. See FIG. 4. Specifically, when solenoid SOL-1 is enabled cylinder 106 retracts cylinder piston 107 and lowers gate 104. Solenoid SOL-1 is enabled whenever relay R-3 is energized.

Indicator light PL-3 is energized whenever palletizer start switch PB-5 is depressed and indicates that the load forming device 138 is forming a stack of bundles in the manner described above.

Relay R-4 in line L-13 is energized whenever palletizer start switch PB-5 has been depressed and control circuit 152 is set for automatic operation. When so enabled, relay R-4 closes normally open switches R-4A, R-4B in lines L-13 and L-18, respectively.

Solenoid SOL-2 in line L-15 controls the operation of feed conveyor 102. Whenever solenoid SOL-2 is enabled, the endless belt of feed conveyor 102 is enabled. When control circuit 152 is operating in the automatic mode, solenoid SOL-2 will be continuously enabled. When control circuit 152 is operating in the manual mode, solenoid 152 is only enabled when palletizer start pushbutton switch PB-5 is depressed and is disabled when switch PB-5 is released.

Relay R-5 is coupled to normally open switches R-5A, R-5B, R-5C and R-5D in lines L-8, L-18, L-46 and L-50, respectively. When relay R-5 is energized, normally open switches R-5A, R-5C and R-5D are closed.

Relay R-6 is coupled to normally open pushbutton switches R-6A, R-6B, R-6C and R-6D in lines L-6, L-14, L-27 and L-55, respectively. When relay R-6 is enabled, normally open switches R-6A, R-6B, R-6C and R-6D are closed. Relay R-6 is enabled whenever switch 108 is closed.

Relay R-7 is coupled to normally closed switches R-7A, R-7C and R-7D in lines L-6, L-17 and L-52, respectively. Relay R-7 is also coupled to normally open switch R-7B in line L-6. When relay R-7 is energized, normally closed switches R-7A, R-7C and R-7D are open and normally open switch R-7B is closed. Relay R-7 is energized whenever switch 110 is closed.

Relay R-8 is coupled to normally closed switches R-8A, R-8B, R-8C and R-8D in lines 6, 8, 13 and 18, respectively. Relay R-8 is also coupled to normally open switch R-8E in line L-23. When relay R-8 is energized, normally open switches R-8A-R-8D are open and normally open switch R-8E is closed. Relay R-8 is energized when switch 112 is closed.

Relay R-9 is coupled to normally closed switch R-9A in line L-23. When switch 114 is closed, relay R-9 is energized and normally closed switch R-9A is open. Solenoids SOL-3 and SOL-4 in lines L-23 and L-24, respectively, control the operation of motor 56. When solenoid SOL-3 is enabled, motor 56 is enabled to raise carrier 37. When solenoid SOL-4 is enabled, motor 56 is energized to lower carrier 37.

Relay R-10 is coupled to normally open switches R-10A and R-10B in lines L-26 and L-27, respectively, and normally close switches R-10C, R-10D and R-10E in lines L-31, L-39 and L-54, respectively. When switch 120 is closed, relay R-10 is energized and normally open switches R-10A and R-10B are closed and normally closed switches R-10C, R-10D and R-10E are open.

Solenoids SOL-5 and SOL-6 in lines L-26 and L-31, respectively control the operation of motor 86. When solenoid SOL-5 is enabled, motor 86 is energized to lower conveyor 74 and when solenoid SOL-6 is enabled, motor 86 is energized to raise conveyor 74.

Relay R-11 is coupled to normally open switches R-11A and R-11B in lines L-24 and L-28, respectively. When relay R-11 is energized, normally open switches R-11A and R-11B are closed.

Relay R-12 is coupled to normally open switches R-12A, R-12C, R-12D, R-12E, R-12F, R-12G and R-12I in lines L-23, L-36, L-39, L-46, L-49, L-58 and L-60, respectively. Relay R-12 is also coupled to normally closed switches R-12B and R-12H in lines L-31 and L-59, respectively. When relay R-12 is energizes, normally open switches R-12A, R-12C through R-12G and R-12I are closed and normally closed switches R-12B and R-12H are open.

Relay R-13 is coupled to normally open switch R-13A and normally closed switch R-13B in lines L-34 and L-36, respectively. When switch 122 is closed, relay R-13 is energized and switches R-13A and R-13B are closed and open, respectively.

Relay R-14 is coupled to normally open switches R-14A and R-14B in lines L-34 and L-37, respectively.

When relay R-14 is energized, switches R-14A and R-14B are closed.

Relay R-15 is couple to normally closed switch R-15A in line L-39. When switch 129 is closed, R-15 is energized and normally closed switch R-15A is opened.

Solenoids SOL-8 and SOL-9 in lines L-39 and L-42, respectively control the operation of motor 70. When solenoid SOL-is is enabled, motor 70 is energized to raise carrier 39. When solenoid SOL-9 is enabled, motor 70 is energized to lower counter 39.

Relay R-16 is coupled to normally open switches R-16A, R-16D and R-16D in lines L-41, L-43 and L-47, respectively, and normally closed switches R-16B in line L-42. When switch 126 is closed, relay R-16 is energized, normally open switches R-16A, R-10C and R-16D are closed and normally close switch R-16B is open.

Relay R-17 is coupled to normally open switches R-17A and R-17B in lines L-42 and L-44, respectively. When relay R-17 is energized, normally open switches R-17A and R-17B are closed.

Relay R-18 is coupled to normally open switches R-18A and R-18B in lines L-46 and L-48, respectively. When switch 128 is closed, relay R-18 is energized and normally open switches R-18A and R-18B are closed.

Relay R-19 is coupled to normally open switches R-19A and R-19B in lines L-48 and L-51, respectively. When relay R-19 is energized, normally open switches R-19A and R-19B are closed.

Relay R-20 is coupled to normally closed switches R-20A and R-20C in lines L-34 and L-50, respectively. Relay R-20 is also coupled to normally open switch R-20B in line L-49. When relay R-20 is energized, normally closed switches R-20A and R-20C are open and normally closed switch R-20B is closed.

Solenoid SOL-10 controls the operation of motor 90. When solenoid SOL-10 is enabled, motor 140 is energized and conveyor belt 78 of conveyor 74 is enabled to discharge bundles from load forming device 138.

Solenoid SOL-11 controls the operation of motor 90. When solenoid SOL-11 is enabled, motor 90 is energized and endless conveyor 18 carries platforms 24–28 through load forming device 38. When solenoid SOL-11 is disabled, motor 90 is de-energized and endless conveyor 18 stops.

Solenoid SOL-12 controls the operation of cylinder 98. See FIG. 4. When solenoid SOL-12 is enabled, rod 97 of cylinder 98 is extended and sprocket 94 is biased against conveyor chain 22 to remove any slack therefrom.

Relay R-21 is coupled to normally open switches R-21A and R-21B in lines L-53 and L-55, respectively. When relay R-21 is enabled, normally open switches R-21A and R-21B are closed.

Time delay relay TDR-1 is coupled to normally open switches TDR-1A and TDR-1B in lines L-32 and L-58, respectively. When time delay relay TDR-1 is enabled, normally open switches TDR-1A and TDR-1B are closed. After a predetermined period of time (for example, one second), time delay relay TDR-1 will automatically disable and normally open switches TDR-1A and TDR-1B will open.

Relay R-23 is coupled to normally open switches R-23A and R-23C in lines L-31 and L-48, respectively. Relay R-23 is also coupled to normally closed switch R-23B in line L-34. When relay R-23 is enabled, normally open switches R-23A and R-23C will be closed and normally closed switch R-23B will be open.

Relay R-24 is coupled to normally open switch R-24A and normally closed switch R-24B in lines L-39 and L-48, respectively. When relay R-24 is energized, switches R-24A and R-24B are closed and open, respectively.

Time delay relay switch TDR-2 is coupled to normally open switch TDR-2A in line L-62. When time delay relay TDR-2 is energized, normally open switch TDR-2A is closed. After a predetermined time (for example, one second), time delay relay TDR-2 is automatically de-energized and normally open switch TDR-2A is reopened.

Photoswitch 160 is a commercially available device which generates a positive voltage at its output terminal 162 whenever light emitted from light source 164 does not reach receiver 166. Photoswitch 160 is a commercially available device and need not be described in detail. One such device is manufactured by Electric Corporation of America under the product designation Model 3000 type 22DJ3.

Counter 168 is a commercially available device which generates an output voltage at its output terminal 170 whenever a presettable number of pulses has been applied to its input terminal 72. One such commercially available counter is A.T.C. Series 336 count controller manufactured by Automatic Timing and Controls, King of Prussia, P2.

Solenoid SOL-13 controls the discharge conveyor 100. Whenever switch 126' is closed, solenoid SOL-13 is enabled and an endless belt on discharge conveyor 100 is enabled.

The operation of control circuit 152 is controlled in great part by the state (open or closed) of switches 108–129 and switch 236. The location of these switches with respect to load forming device 138 is illustrated in FIG. 6. Switch 108 is coupled to the center portion of frame 12 and will be closed whenever carrier 37 is in its lowermost or bundle receiving position. As will be shown in greater detail below, switch 108 disables solenoid SOL-4 when carrier 37 is in its lowermost position and prevents motor 56 from attempting to further lower carrier 37.

Switch 110 is coupled to frame 12 adjacent the inlet end of load forming device 138 and is positioned for contact by the platforms 24–28. When switch 110 is tripped by one of the platforms, it actuates solenoid R-7 causing gate 104 to descend. When control circuit 152 is set for manual operation, the tripping of switch 110 also stops the conveyor 18.

Switch 112 is coupled to carrier 37 in a position so that it may be tripped by a leading edge of platforms 24-28 when the platforms are in the positions illustrated in FIGS. 9, 12, 15 and 19-21. When switch 112 is tripped, it causes cylinder 106 to elevate gate 104 provided that switch 114 is also open. When switch 112 is tripped, it also causes motor 56 to raise carrier 37 until switch 114 is tripped by carrier 39.

Switch 114 is mounted on carrier 37 and is positioned to be tripped when carrier 37 is at the same lever as carrier 39. As noted above, when carrier 39 is contacted by switch 114, motor 56 is shut off to thereby stop the carrier 37 at any elevation where it is located, namely the elevation of carrier 39.

Switch 116 controls the operation of power cylinder 98. Switch 116 is open when carrier 39 is in the lowermost position and closed at all other times. When switch 116 is closed, it enables relay R-21 and causes power cylinder 98 to take up any slack in conveyor chain 20.

Switch 118 determines the lowermost position of carrier 39. Switch 118 is open when carrier 39 is in its lowermost position and closed at all other times. When carrier 39 is in its lowermost position and switch 118 is open, solenoid SOL-9 is disabled and motor 70 can no longer be energized to lower carrier 39.

Switch 120 is mounted on carrier 39 in a position so as to be contacted by the front edge of platforms 24-28 when they are in the position illustrated in FIGS. 10, 13, 17 and 22. When switch 120 is tripped, it locks carrier 39 at any elevation where it is located until the back edge of platforms 24-28 pass switch 120 and switch 120 is no longer tripped. See FIG. 11.

Switch 122 is coupled to frame 12 adjacent the exit end 16 thereof. Switch 122 determines the uppermost position of conveyor 74 and is positioned to be tripped by conveyor 24 when in the position illustrated in FIGS. 7-11 and 22. When switch 122 is tripped, it disables solenoid SOL-7 and prevents motor 86 from further raising conveyor 74. Switch 124 performs the same function as switch 122 but determines the lowermost position for conveyor 74.

Switch 126 is in a position so that it is contacted by bundles being discharged from conveyor 74 onto conveyor 100. When switch 126 has been tripped by the bundles discharged from conveyor 74 and then released thereby, solenoid SOL-9 will be enabled and motor 70 will be energized to lower carrier 39. A similar switch 126' may be positioned on conveyor 100 adjacent switch 126 for enabling conveyor 100.

Switch 128 is located in the upper righthand corner of frame 12 in FIG. 6. Switch 128 is positioned to be tripped when a platform 24-28 is located in the position illustrated in FIGS. 19-21. After the predetermined number of bundles has been stacked by load forming device 138 and switch 128 has been tripped, motor 90 will be disabled and platforms 24-28 will remain in the position shown in FIGS. 19-21. At the same time, motor 140 will be enabled so that conveyor 74 can transfer the bundle of materials from load forming device 138 to conveyor 100. When switch 126 is cleared by the discharge load, motor 90 is re-enabled and the bundle stacking process repeats itself.

Switch 129 is mounted on the upper part of frame 12 and is tripped by carrier 39 when carrier 39 is in its uppermost position. When switch 129 is tripped, solenoid SOL-8 is disabled so that motor 70 can no longer raise carrier 39.

Light source 164 of photoswitch 160 is located on one side of carrier 39. The receiver 166 of photoswitch 160 is located at an equivalent position on the opposite side of carrier 39. When so located, the light emitted from light source 164 will reach receiver 166 when carrier 39 is above the bundles located on conveyor 74 and will be blocked at all other times.

The manner in which control circuit 152 controls the operation of apparatus 10 is as follows. It should first be assumed that apparatus 10 is in the position illustrated in FIG. 7 and that power on switch PB-4 and feed conveyor start switch PB-8 are depressed. Additionally, it will be assumed that load switch PB-6 is set for automatic operation so that control circuit 152 operates in the automatic mode.

After pushbutton switches PB-4 and PB-8 have been closed, relay R-1 is energized and switch R-1A in line L-6 is closed. When apparatus 10 is in the position shown in FIG. 7, switch 108 will be closed and switches 110 and 112 will be open. Accordingly, normally closed switches R-7A and R-8A in line L-6 will be closed and normally open switch R-6A will also be closed. Relay R-2 will be energized and normally open switches R-2A and R-2B in lines L-7 and L-8, respectively, will be closed. Relay R-2 will remain energized until switch 112 is closed.

To begin the load forming operation, palletizer start switch PB-5 is depressed energizing relays R-4 and R-5. At the same time, solenoid SOL-2 is enabled and feed conveyor 102 begins operating. Since relay R-4 has been energized, normally open switches R-4A and R-4B in lines L-13 and L-18, respectively, are closed. Solenoid SOL-2 will remain enabled during the entire operation of load forming device 138.

Since relay R-5 is energized, normally open switches R-5A and R-5B are closed. Relay R-5 will remain energized until switch 112 is closed.

Referring now to line L-8, normally open switches R-2B and R-5A are closed as is normally closed switch R-8B. However, since apparatus 10 is in the position shown in FIG. 7, switch R-7B is open and relay R-3 is not energized. When relay R-5 is energized, however, switch R-5D in line L-50 is closed and solenoid SOL-11 is enabled. When solenoid SOL-11 is enabled, motor 90 is energized and platforms 24-28 begin moving with conveyor 18. When platform 24 reaches the position shown in FIG. 8, switch 110 is tripped, enabling R-7 and closing switch R-7B. Since normally open switch R-7B is closed, relay R-3 is enabled. This will close normally open switch R-3C in line L-11 and solenoid SOL-1 will be enabled thereby opening gate 104. At this point, feed conveyor 102 transfers bundle 132 onto platform 24. See FIGS. 8 and 9.

Figure 9:
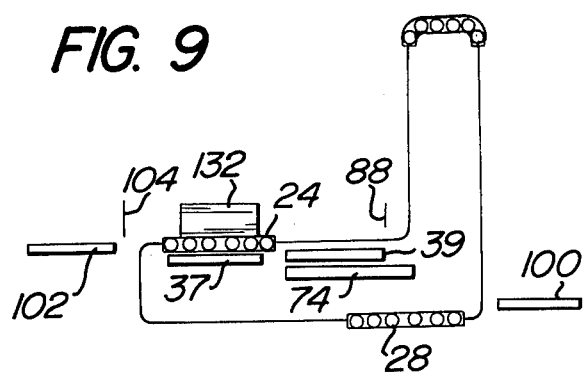

When platform 24 reaches the position shown in FIG. 9, switch 112 is closed and rely R-8 is enabled opening normally closed switches R-8A and R-8B and disabling relays R-2 and R-3. Since relay R-3 is disabled, switch R-3C is open and solenoid SOL-1 is disabled closing gate 104.

Figure 10:
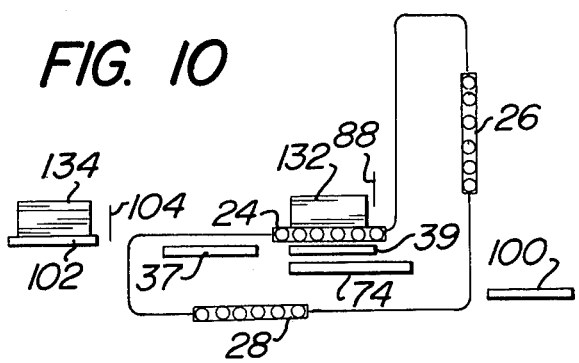

Bundle 132 is advanced to the position shown in FIG. 10 at which time switches 120 and 236 are tripped by platform 24 and bundle 132, respectively. When switch 120 is tripped, relay R-10 in line L-25 is energized and normally open switch R-10A in line L-26 is closed. Since switch 236 has also been closed, solenoid SOL-5 is enabled causing centering device 200 to orient the bundle in the manner described above.

Figure 11:
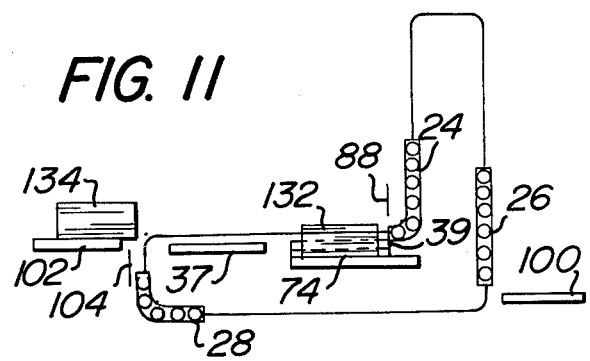

As platform 24 continues to advance, it will reach the position illustrated in FIG. 11 wherein switch 120 is released and bundle 132 rests on conveyor 74. When switch 120 is released, relay R-10 is de-energized closing normally closed switch R-10C in line L-31. Since conveyor 74 is in its uppermost position, normally closed switch R-12B is also closed. Bundle 132 is dropped into the position shown in FIG. 11, the light emitted from light source 164 does not reach receiver 166 and an output voltage appears at output terminal 162 of photoswitch 160. See FIG. 23C. Since conveyor 74 is in its uppermost position, normally closed switch R-12H in line L-59 will be closed and relay R-23 is enabled. This closes switch R-23A in line L-31 and energizes solenoid SOL-6. When solenoid SOL-6 is enabled, it energizes motor 86 to lower conveyor 74. Solenoid SOL-6 remains energized until bundle 132 clears light source 164, disabling relay R-24 and opening normally open switch R-23A in line L-31. At this point, apparatus 10 is in the position illustrated in FIG. 12.

When photoswitch 160 generates an output signal at its output terminal 162, time delay relay TDR-2 in line L-61 is energized closing normally open switch TDR-2A in line L-62 thereby applying an input signal to terminal 172 of counter 168. After a pedetermined period of time, switch TDR-2A is again opened and remains open until relay TDR-2 is again energized. As a result of the thus generated input signal, the bundle count in counter 168 increases to one.

In the meantime, platform 28 has successively tripped switches 110 and 112 and a new bundle 134 has been delivered to the load forming device 138. Platform 28 advances bundle 134 to the position illustrated in FIG. 13 wherein bundle 134 trips switch 236 and platform 28 trips switch 120. The bundle centering device 200 centers bundle 134 and solenoid SOL-8 is enabled as above. When conveyor 74 reaches its lowermost position, switch 124 is tripped enabling relay R-12 (line L-29). Since relay R-12 is enabled, normally closed switch R-12B in line L-31 is opened and solenoid SOL-6 is de-energized. The energization of relay R-12 also closes normally open switches R-12D and R-12I in lines L-39 and L-60, respectively. Additionally, normally closed switch R-12H in line L-59 is open disabling relay R-23.

Since the light generated by light source 164 is still blocked by bundle 134, relay R-24 is enabling closing normally open switch R-24A in line L-39. This enables solenoid SOL-8 since switches 120 and 129 are open and normally closed switches R-15A and R-10D are closed. Since solenoid SOL-8 is enabled, motor 70 raises carriage 39. When light source 164 finally clears bundle 134, output 162 of photoswitch 160 is disabled, relay R-24 is de-energized and solenoid SOL-8 is disabled. At this point, apparatus 10 will be in the position illustrated in FIG. 15.

As above, when photoswitch 160 generates an output signal at its output terminal 162, time delay relay TDR-2 in line L-61 is energized closing normally open switch TDR-2A in line L-62 and a second input signal is applied to input terminal 172 of counter 168.

Figure 15:
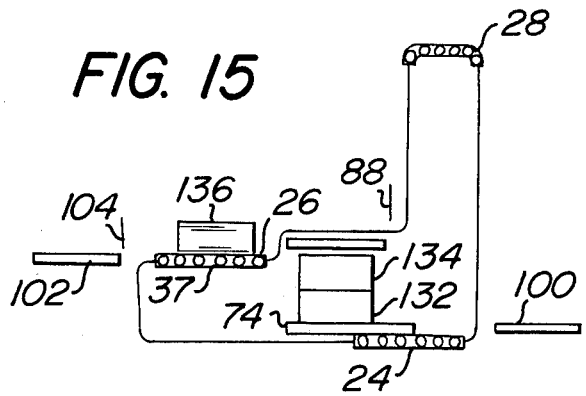
Figure 16:
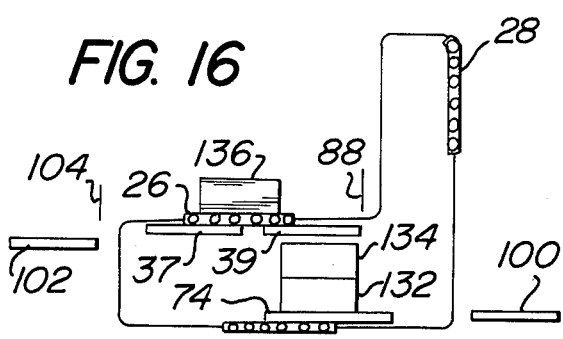

A third bundle 136 has been placed on platform 26 and is in the position illustrated in FIG. 15 after carrier 39 has been raised above bundle 134. When in this position, switch 112 is closed and gate 104 is raised as above. The closing of switch 112 energizes relay R-8 which closes normally open switch R-8E in line L-23. Since carrier 39 has been raised above carrier 37, switch 114 is open and switch R-9A in line L-23 is closed. Additionally, since conveyor 74 is now in its lowermost position, switch 124 is closed and relay R-12 is energized. The energization of relay R-12 closes normally open switch R-12A in line L-23 enabling solenoid SOL-3 which energizes motor 56, raising carrier 37. When carrier 37 reaches the level of carrier 39, switch 114 is again closed energizing relay R-9 and opening normally closed switch R-9A in line L-23. Solenoid SOL-3 is disabled and power to motor 56 is cut off. Compare FIGS. 15 and 16.

Figure 17:
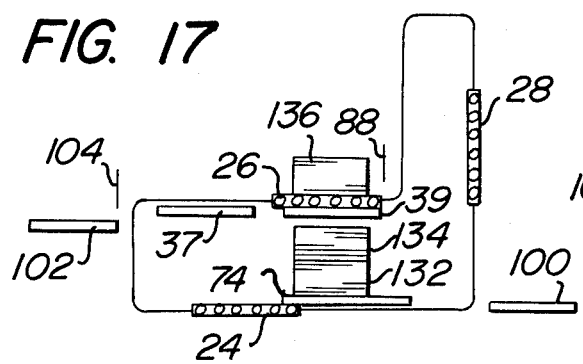

Platform 26 continues to advance around endless conveyor 18 and moves bundle 136 into the position illustrated in FIG. 17. Switch 236 is closed, causing bundle centering device 200 to center bundle 136 and switch 120 is again tripped disabiling solenoid SOL-6 and SOL-8.

Since carrier 37 is no longer in the lowermost position, switch 108 is open and relay R-6 is disabled closing switch R-6C in line L-27. Since switch 120 is closed, relay R-10 is energized, switch R-10B in line 27 is closed and relay R-11 is energized. Switch R-11A in line L-24 is closed and solenoid SOL-4 is enabled causing motor 56 to lower carrier 37. When carrier 37 returns to its lowermost position, switch 108 is closed, relay R-6 is energized and normally closed switch R-6C in line L-27 is open, de-energizing relay R-11 and disabling solenoid SOL-4. Compare FIGS. 17 and 18.

Figure 18:
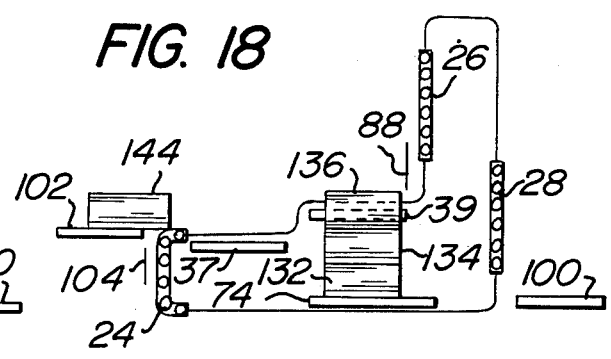
Figure 19:
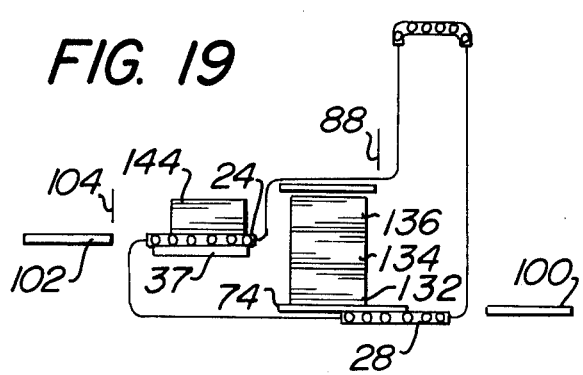

In the meantime, platform 26 has advanced to the position shown in FIG. 18, switch 120 has been opened, and the light generated by light source 164 is blocked by bundle 136. An output signal appears at output terminal 162 of photoswitch 160 enabling relay 24 (conveyor 74 is in the lowermost position and switch 124 is closed) and time delay relay TDR-2.

The energization of relay R-24 closes normally open switch R-24A in line L-39 enabling solenoid SOL-8 as above. Power is applied to motor 70, raising carrier 39 until the light emitted by light source 164 is no longer blocked by bundle 136. At this point, photoswitch 160 stops generating an output at output terminal 162 thereby disabling relay R-24 and time delay relay TDR-2.

Counter 168 has now sensed three input signals on its input terminal 172 and generates an output signal on its output terminal 170 which de-energizes motor 90 in the following manner. The energization or relay R-22 closes normally open switch R-22B in line L-46. Normally open switch R-12E in line L-46 is also closed since conveyor 74 is in its lowermost position and switch 124 is closed. As platforms 24-26 advance through load forming device 138, they reach the position shown in FIG. 19 wherein platform 28 closes switch 122 and platform 26 closes switch 128. The closing of switch 112 energizes relay R-8, opens normally closed switch R-8D (line L-18) and disables relay R-5 closing normally closed switch R-5C in line L-46. The closing of switch 128 enables relay R-18 and closes normally open switch R-18A in line L-46. Since switches R-22B, R-18A, R-12E and R-5C are also closed, relay R-19 is energized and normally open switch R-19A in line L-48 is closed. The energization of relay R-22 also closes normally open switch R-22C in line L-57 energizing time delay relay TDR-1 and closing normally open switch TDR-1B in line L-58. This energizes relay R-23 since switch 124 is closed and closes normally open switch R-23C in line L-48 which energizes relay R-20 since relay R-24 is de-energized (switch 124 is closed) and relay R-18 is energized (switch 120 is closed). The energization of relay R-20 opens normally closed switch R-20C in line L-50 disabling solenoid SOL-11, cutting power to motor 90 and stopping endless conveyor 18 in the position illustrated in FIG. 19.

The energization of relay R-20 also closes normally open switch R-20B in line L-49 enabling solenoid SOL-10 (switch 124 is closed and relay R-12 is energized). The enabling of solenoid SOL-11 energizes motor 86 and causes conveyor 74 to discharge bundles 132-136 onto discharge conveyor 100. See FIGS. 20 and 21.

Figure 22:
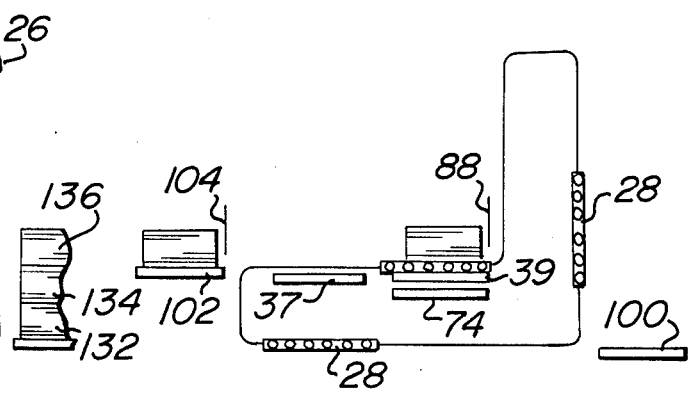

When control circuit 152 detects that bundles 132-136 have been completely conveyed to discharge conveyor 100, solenoids SOL-7 and SOL-9 are enabled to raise conveyor 74 and lower carrier 39 into the position shown in FIG. 22. This operation is performed as follows. Since carrier 39 is not in the lowermost position, switch 118 in line L-42 is closed. As bundles 132-136 first reach discharge conveyor 100, they trip switch 126, energizing relay R-16, closing normally open switch R-16C in line L-43 and energizing relay R-17. R-17 will stay energized until carrier 39 is in its lowermost position and switch 118 is open. When the trailing edge of bundles 132-136 pass switch 126, switch 126 is opened, disabling relay R-16, closing normally closed switch R-16B in line L-42 and energizing solenoid SOL-9 (relay R-17 is still energized). The enabling of solenoid SOL-9 energizes motor 70 and lowers carrier 39. When carrier 39 reaches its lowermost position, switch 118 is open and solenoid SOL-9 is disabled.

A predetermined time after counter 168 energizes relay R-22, TDR-1 is automatically disabled, opening switch TDR-1B in line L-58 and de-energizing relay R-23. The de-energization of relay R-23 closes normally closed switch R-23B in line L-34 and opens normally open switch R-23C in line L-48. As soon as bundles 132-136 clear switch 126, relay R-16 will be de-energized, opening normally open switch R-16D in line L-47 and de-energizing relay R-20. The de-energization of R-20 closes normally closed switch R-20A in line L-34. Since conveyor 74 is in its lowermost position, switch 122 will be open and switch 124 will be closed. In this position, relay R-13 will be de-energized and relay R-14 will be energized. Relay R-14 will remain energized until switch 122 is closed. Since relays R-13 and R-14 are de-energized, respectively, switches R-13A and R-14A will both be closed and solenoid SOL-7 will be enabled and motor 86 will raise conveyor 74 until conveyor 74 trips switch 122. When switch 122 is closed, relay R-13 will be energized and solenoid SOL-7 will be disabled.

In the meantime, relay R-20 has been disabled as above and solenoid SOL-11 has again been enabled. When so enabled, motor 90 is energized and conveyor 18 moves platforms 24-28 whereby the process repeats itself.

The foregoing description describes the operation of control circuit 152 when operated in the automatic mode. In the manual mode, the palletizer start switch PB-5 must be depressed each time a new bundle is to be loaded onto load forming device 38. Additionally, solenoid SOL-11 is disabled and motor 90 de-energized each time a new platform 24, 26 or 28 trips switch 110. When in this position, palletizer start button PB-5 is again depressed and a new bundle is transferred to load forming device 138. The bundle so transferred will be centered and stacked on conveyor 74 in the manner described above until a new platform 24, 26 or 28 trips switch 110.

The apparatus is designed for high speed operation and can handle each bundle or layer of bundles in 7½ seconds. No adjustments are needed to attain centering of bundles. There are no reciprocating actions except for the wing panels of centering device 200. The apparatus 10 is operated at floor level so no pit is required while being quiet in operation and using low factory air pressure.

The present invention may be embodied in other specific forms without departing from the spirit or essential attributes thereof and, accordingly, reference should be made to the appended claims, rather than to the foregoing specification as indicating the scope of the invention.

What is claimed is:

1. Apparatus comprising:
   a. a frame,
   b. an endless conveyor supported by said frame, a plurality of rotatable guide members in contact with said conveyor, a group of said guide members being supported so that their elevation may be changed, said conveyor having a horizontal top run and a bottom run, said conveyor having spaced platforms,
   c. motor means connected to said conveyor for driving said conveyor,
   d. first and second carriers supported by said frame for independent movement in a vertical direction, each carrier being adjacent a separate portion of the top run of said conveyor, each carrier supporting at least two of said group of guide members, said second carrier being downstream from said first carrier,
   e. discrete motors for moving said carriers in a vertical direction,
   f. means adjacent said second carrier for transferring articles off one of said conveyor platforms while said one platform is located along the top run of said endless conveyor and supported by said second carrier, and
   g. conveyor means for receiving articles transferred from said platforms.

2. Apparatus in accordance with claim 1 wherein said transfer means downstream from the second carrier is a stationary limit stop which pushes articles off the back edge of a platform as the platform moves beneath the limit stop.

3. Apparatus in accordance with claim 1 wherein said conveyor is L-shaped with a vertical run extending upwardly from the top run.

4. Apparatus in accordance with claim 1 including light means on the second carrier for sensing when the second carrier has moved upwardly for a sufficient distance to clear the top of the last articles transferred off the platforms.

5. Apparatus in accordance with claim 1 including means for causing said second carrier to move upwardly in stages after each article is transferred off a platform, and means for causing said first carrier to sequentially move up and down from its article receiving position to an elevation corresponding to the elevation of the second carrier.

6. Apparatus for forming a multi-layered load of articles comprising:
   a. an input conveyor,
   b. a frame adjacent the downstream end of said input conveyor,
   c. an endless conveyor supported by said frame, said endless conveyor having a horizontal run adjacent said input conveyor for receiving a layer of the articles and a vertical run downstream from the horizontal run,
   d. motor means for driving said endless conveyor,
   e. a plurality of spaced platforms supported by said endless conveyor for retaining discrete layers of the articles while they are one the horizontal run of said endless conveyor,
   f. carrier means supported by said frame for supporting the horizontal run of said endless conveyor,
   g. a plurality of rotatable guide members in contact with said endless conveyor, a first group of said guide members being supported by said carrier means for the horizontal run and a second group of said guide members being supported by said frame at an elevation substantially above said first group of said guide members for defining the vertical run of said endless conveyor, h. means adjacent said carrier means for pushing a layer of the articles from its supporting platform as said platform advances with said endless conveyor, i. take-off conveyor means supported by said frame for movement in a vertical direction and disposed below said carrier means for receiving a layer of the articles pushed from said platform, j. motor means for lowering said take-off conveyor a distance greater than the height of a layer of the articles so that, as a succeeding layer of the articles is pushed from a succeeding platform, the succeeding layer is deposited upon the preceding layer, k. motor means connected to said take-off conveyor for periodically driving said take-off conveyor for ejecting the multi-layered load of articles through the space between a pair of said platforms.

7. Apparatus in accordance with claim 6 wherein said input conveyor includes means for detaining a layer of the articles; means on said frame responsive to the passage of a layer of the articles for releasing said detaining means to allow entry of a layer of the articles onto said endless conveyor; and means for reactivating said detaining means after entry of the layer of articles.

8. Apparatus in accordance with claim 7 including means associated with said carrier means for orienting the layer of articles.

9. Apparatus for forming a multi-layered load of articles comprising:

a. an input conveyor including means for detaining a layer of articles thereon, b. a frame adjacent the downstream end of said input conveyor; said frame having an input end and an output end, c. an endless conveyor supported by said frame, said endless conveyor having a horizontal run adjacent said input conveyor for receiving a layer of the articles therefrom and a vertical run adjacent the output end of said frame, d. motor means for driving said endless conveyor, e. a plurality of spaced platforms supported by said endless conveyor for retaining discrete layers of the articles while said endless conveyor is on the horizontal run, f. first carrier means for supporting a portion of the horizontal run of said endless conveyor, said first carrier means being adjacent the input end of said frame and supported by said frame for movement in a vertical direction, g. second carrier means for supporting the remaining portion of the horizontal run of said endless conveyor, said second carrier means being downstream of said first carrier means and supported by said frame for movement in a vertical direction independent of said first carrier means, h. a plurality of rotatable guide members in contact with said endless conveyor, a first group of said guide members being supported by said first carrier means, a second group of said guide members being supported by said second carrier means, and a third group of said guide members being supported by said frame at an elevation substantially above said second carrier means for defining the vertical run of said endless conveyor, i. means associated with said second carrier means for pushing a layer of the articles from its supporting platform as said platform advances with said endless conveyor, j. take-off conveyor means supported by said frame for movement in a vertical direction and disposed below said second carrier means for receiving a layer of the articles pushed from said platform, k. reversible motor means for lowering said take-off conveyor a distance greater than the height of a layer of the articles so that, as a succeeding layer of the articles is pushed from a succeeding platform, the succeeding layer is deposited upon the preceding layer to form a multi-layered load, and l. motor means connected to said take-off conveyor for ejecting the multi-layered load of articles through the space between a pair of said platforms.

10. Apparatus in accordance with claim 9 including reversible motor means responsive to the elevation of said take-off conveyor for raising said second carrier sequentially a distance greater than the height of a layer of the articles; reversible motor means responsive to the elevation of said second carrier means for raising said first carrier means to an elevation substantially corresponding to the elevation of said second carrier means; and means in contact with said endless conveyor for reconciling variations in the length of said endless conveyor as the elevation of said second carrier means varies from the elevation of said first carrier means.

11. Apparatus in accordance with claim 10 including means associated with said second carrier means for automatically orienting each layer of the articles.

* * * * *